C. H. BILLINGS.
Pruning-Shears.
No. 160,563. Patented March 9, 1875.
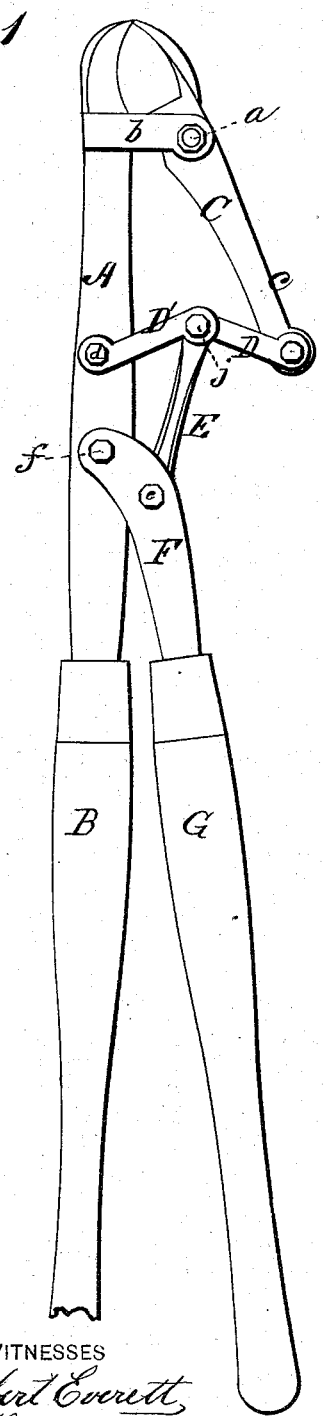
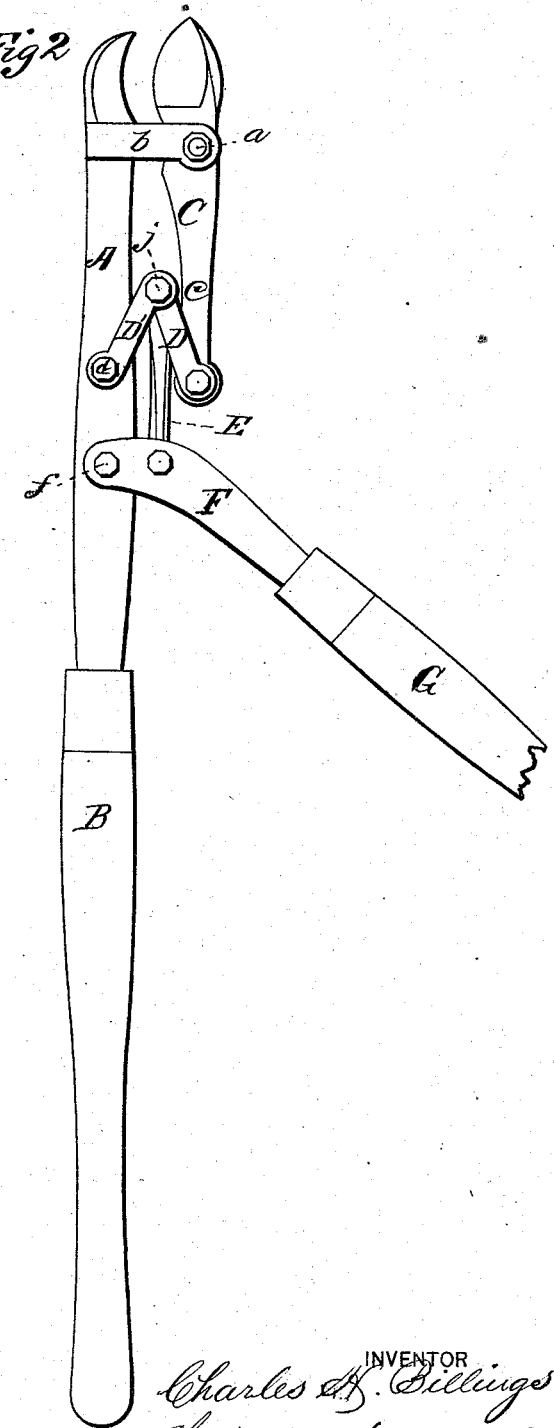
WITNESSES
Robert Everett
F. J. Masi
INVENTOR
Charles H. Billings
Chipman Hosmer & Co.
ATTORNEYS
THE GRAPHIC CO.PHOTO-LITH. 39 & 41 PARK PLACE, N.Y.

UNITED STATES PATENT OFFICE.

CHARLES H. BILLINGS, OF LA GRANGE, INDIANA.

IMPROVEMENT IN PRUNING-SHEARS.

Specification forming part of Letters Patent No. 160,563, dated March 9, 1875; application filed January 23, 1875.

*To all whom it may concern:*

Be it known that I, CHARLES H. BILLINGS, of La Grange, in the county of La Grange and State of Indiana, have invented a new and valuable Improvement in Pruning-Shears; and I do hereby declare that the following is a full, clear, and exact description of the construction and operation of the same, reference being had to the annexed drawings, making a part of this specification, and to the letters and figures of reference marked thereon.

Figures 1 and 2 of the drawings are representations of plan views of my device.

This invention has relation to improvements in devices in the nature of shears, which are adapted to be used for pruning trees and shrubbery, for trimming bolts, and other like purposes; and the nature of the invention consists in combining, with the movable jaw of a shearing device, a toggle-jointed rod, pivoted at one of its ends to the shank of the movable jaw, and at its other end to that of the fixed jaw, and actuated by means of a vibrating lever having its fulcrum upon the shank of the fixed jaw, and connected pivotally with the said toggle-jointed rod by means of a link, whereby I am able to obtain from a given degree of actuating force a very high degree of cutting power for the shears, as will be hereinafter more fully explained.

In the annexed drawings, A designates the fixed arm of a pair of shears, having a wooden handle, B; and C, the movable jaw thereof, pivoted at *a* in the bifurcated upper end of a standard, *b*, rigidly secured to the shank of the fixed jaw A, slightly in rear of its cutting part. The shank *c* of movable jaw C is pivoted to the upper end of a link, D, which forms, with a second link, D', pivoted at *d* to the shank of the fixed jaw, a toggle-joint, *j*, as shown in Figs. 1 and 2. E designates a rod, pivoted to links D D' at their joint, and to an actuating-lever, F, at *e*, the said lever being provided with a handle, G, and fulcrumed at *f* upon the shank of the fixed jaw, in rear of the pivot of link D'. When lever F is thrust down toward the handle B of the fixed jaw, such actuation will carry along with the said lever the rod E, thereby straightening out links D D', and causing them to thrust the power-arm of movable jaw C upward, depressing the cutter-blade of the said jaw with great power against the cutting-edge of the fixed arm, thereby effecting a speedy separation of any object interposed between the said cutting-edges. The power thus imparted to the cutting-blades of the fixed and movable jaws being very great, the implement above described is not only adapted to be used for trimming hedges, shrubbery, and the like, but also for cutting bar-iron into lengths, trimming bolts, and for other like purposes wherein a great degree of power is required, and, as the implement may be of any size, may be used as well for severing nail-rods as for cutting bolts of large size.

What I claim as new, and desire to secure by Letters Patent, is—

In a pruning implement, the combination, with the movable jaw C and the fixed jaw A, of the toggle-jointed links D D', connecting-rod E, and vibrating actuating-lever F, pivoted to the shank of the fixed jaw A, substantially as specified.

In testimony that I claim the above I have hereunto subscribed my name in the presence of two witnesses.

CHARLES H. BILLINGS.

Witnesses:
ALONZO D. MOHLER,
E. R. STEELE.